United States Patent
Xiao et al.

(10) Patent No.: US 11,310,069 B2
(45) Date of Patent: Apr. 19, 2022

(54) VARIABLE TERMINATION IN A VEHICLE COMMUNICATION BUS

(71) Applicant: Samsara Networks Inc., San Francisco, CA (US)

(72) Inventors: Justin Tingao Xiao, San Francisco, CA (US); Benedict Fraser Walker, San Francisco, CA (US); Xin Yang, Oakland, CA (US)

(73) Assignee: Samsara Networks Inc., San Francisco, CA (US)

( * ) Notice: Subject to any disclaimer, the term of this patent is extended or adjusted under 35 U.S.C. 154(b) by 35 days.

(21) Appl. No.: 16/943,652

(22) Filed: Jul. 30, 2020

(65) Prior Publication Data
US 2022/0038301 A1    Feb. 3, 2022

(51) Int. Cl.
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC ............. G06F 11/3013; G06F 11/0793; G06F 11/349; G06F 11/0739; G06F 13/364; G06F 13/4068; G06F 13/086; G06F 13/4282; G06F 11/00; G06F 11/07; G06F 11/34; G06F 11/30; G01R 31/50; G01R 31/006; G01R 31/04; G01R 31/02; G01R 31/00; H04L 49/555; H04L 12/2823; H04L 49/205; H04L 5/16; H04L 12/40; H04L 12/40013; H04W 4/02; H04B 1/38; H03K 17/16

USPC ......................................................... 370/257
See application file for complete search history.

(56) References Cited

U.S. PATENT DOCUMENTS

| | | | | |
|---|---|---|---|---|
| 7,038,485 B2* | 5/2006 | Nakashima | ......... | H04L 25/0278 326/16 |
| 8,015,445 B2* | 9/2011 | Ando | .................. | H04L 43/0823 714/25 |
| 8,638,838 B1* | 1/2014 | Betts | ................... | H04L 25/0294 375/219 |
| 9,471,528 B2* | 10/2016 | Muth | .................. | H04L 12/4135 |
| 9,568,533 B2* | 2/2017 | Jiang | .................... | G01R 31/006 |
| 9,678,131 B2* | 6/2017 | Jiang | .................... | G06F 11/3013 |
| 9,678,847 B2* | 6/2017 | Du | ....................... | G06F 11/3027 |
| 9,960,930 B2* | 5/2018 | Riedel | ................ | G06F 13/4282 |
| 10,425,361 B2* | 9/2019 | Daugherty, III | ...... | H04L 49/205 |
| 10,574,553 B2* | 2/2020 | Du | ........................ | B60T 17/221 |

(Continued)

*Primary Examiner* — Man U Phan
(74) *Attorney, Agent, or Firm* — Schwegman Lundberg & Woessner, P.A.

(57) ABSTRACT

Disclosed are systems, methods, and non-transitory computer-readable media for variable termination in a vehicle communication bus. To provide compatibility with multiple vehicles, a device may include a software selectable terminator resistor that can be programmatically enabled or disabled to add or remove resistance as needed. For example, the software selectable terminator resistor may be enabled when the device is added as an end node in a high-speed communication bus and operates as a terminator resistor. Alternatively, the software selectable terminator resistor may be disabled when the device is added as an intermediate node positioned between terminator resistors in the high-speed communication bus.

18 Claims, 8 Drawing Sheets

(56) References Cited

U.S. PATENT DOCUMENTS 10,800,363 B2 * 10/2020 Du .......................... B60R 21/01
2021/0184328 A1 * 6/2021 Seki ......................... H01P 5/18

* cited by examiner

VARIABLE TERMINATION IN A VEHICLE COMMUNICATION BUS

TECHNICAL FIELD

Embodiments of the present subject matter relate generally to vehicles and, more specifically, to variable termination in a vehicle communication bus.

BACKGROUND

Modern vehicles are equipped to provide many computer managed features. For example, vehicles include computers, sensors, and actuators that monitor and/or control engine emissions, tire pressure, anti-lock brakes, climate systems, automated driving, and the like. These devices communicate with each other using a bus standard, such as CAN bus, that allows microcontrollers and electronic devices to communicate with fast and reliable data transfer in electrically noisy environments with minimal wiring. Many vehicles include a port that allows external accessory devices to be connected to the CAN bus of the vehicle to communicate with the various computers, sensors, and/or actuators connected to the CAN bus. For example, vehicles often include a diagnostic port that allows for diagnostic tools to interface with the CAN bus by transmitting commands, reading data, and the like. While many vehicle manufacturers use a common bus standard, implementation of the communication bus by each manufacturer may vary. As a result, various versions of an accessory device are often developed to provide compatibility with different types of vehicles.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
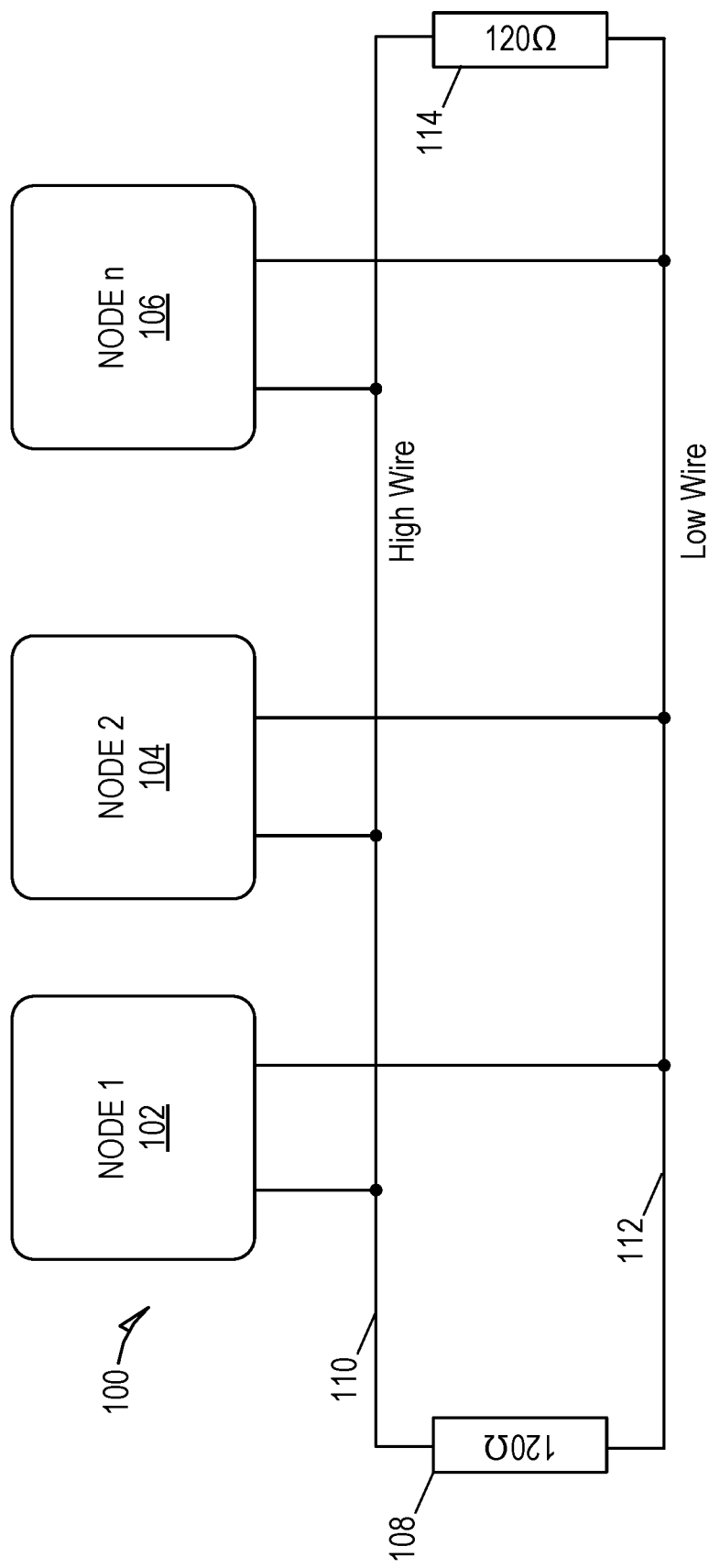
FIG. 1 is a block diagram of a high-speed communication bus with terminator resistors integrated into each end of the wiring harness, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for variable termination in a vehicle communication bus. Vehicles often utilize a high-speed communication bus (e.g, CAN bus) to connect various computing nodes, such as sensors, electronic computing nodes (ECUs), actuators, and the like. A high-speed communication bus uses two dedicated wires (e.g., CAN high and CAN low) to transmit data. Terminator resistors are used at each end of a high-speed communication bus to prevent signal reflections. For example, terminator resistors connecting the two dedicated wires are positioned at each end of the high-speed communication bus to create a circuit loop in which the two terminator resistors operate in parallel. Many high-speed communication buses, such as CAN bus, use 120 Ohm terminator resistors at each end of the circuit loop. The termination at each end absorbs the signal energy, ensuring that it is not reflected from the cable ends to prevent interference and damaged signals.

The terminator resistors in many high-speed communication buses are integrated into the wiring harness itself. For example, the terminator resistors are integrated into each end of the wiring harness to provide proper termination throughout the high-speed communication bus. Nodes connected to these types of high-speed communication buses are therefore intermediate nodes positioned between the two terminator resistors and do not have to utilize internal resistors. Some high-speed communication buses, however, are designed to utilize devices with internal resistors positioned at one or both ends of the high-speed communication bus. In this type of design, the end nodes connected to one or both ends of the high-speed communication bus function as the terminator resistors for the circuit loop, while the nodes connected between the ends of the high-speed communication bus are intermediate nodes that do not utilize internal resistors.

Due to the varied high-speed communication bus designs used by vehicle manufacturers, multiple versions of devices are often made to provide compatibility with different vehicles. For example, one version of a device may include an internal resistor to provide compatibility with a high-speed communication bus in which the device will be added as an end node to operate as a terminator resistor for the circuit loop. Alternatively, a second version of the device may be designed without an internal resistor to provide compatibility with a high-speed communication bus in which the device will be an intermediate node attached between terminator resistors.

To provide compatibility with multiple vehicles, a device may include a software selectable terminator resistor that can be programmatically enabled or disabled to add or remove resistance as needed. For example, the software selectable terminator resistor may be enabled when the device is added as an end node in a high-speed communication bus and operates as a terminator resistor. Alternatively, the software selectable terminator resistor may be disabled when the device is added as an intermediate node positioned between terminator resistors in the high-speed communication bus.

When the device is attached to a high-speed communication bus, a determination is made as to whether the software selectable terminator resistor should be enabled or disabled. This determination may be performed in multiple ways. For example, an identifier for the vehicle (e.g., Vehicle Identification Number (VIN)) may be provided to a remote computing system that maintains a vehicle data index. The vehicle data index includes data indicating the high-speed communication bus design used for various vehicles. For example, the vehicle index data may include data indicating whether the high-speed communication bus utilizes end nodes that operate as terminator resistors and/or whether the high-speed communication bus includes a port (e.g., diagnostic port) implemented as an end node to which devices may be connected to the high-speed communication bus. The remote computing system determines the vehicle type (e.g., make and model) based on the provided identifier, which is then used along with the vehicle data index to determine whether the software selectable terminator resistor should be enabled or disabled. The remote computing system provides a response to the device indicating whether the software selectable terminator resistor should be enabled or disabled.

Alternatively, the resistance in the high-speed communication bus may measured to determine whether the software selectable terminator resistor should be enabled or disabled. For example, a defined voltage my be applied across the high-speed communication bus, during which current is measured at multiple points on the high-speed communication bus. The current measurement is used to calculate the resistance in the high-speed communication bus, which is then compared to a threshold resistance range to determine whether the software selectable terminator resistor should be enabled or disabled.

FIG. 1 is a block diagram of a high-speed communication bus 100 with terminator resistors 108, 114 integrated into each end of the wiring harness, according to some example embodiments. As shown, the high-speed communication bus 100 includes two signal wires (i.e., a high wire 110 and a low wire 112) that connect multiple nodes 102, 104, 106. The two signal wires 110, 112 are connected at each end by terminator resistors 108, 114. As shown, the terminator resistors 108, 114 are each 120 Ohm resistors, as is standard in high-speed communication buses such as CAN bus, however a different resistor may be used based on the specifications of the high-speed communication bus 100 that is used.

Although three nodes 102, 104, 106 are shown as being connected to the high-speed communication bus 100, any number of nodes 102, 104, 106 may be connected to the high-speed communication bus 100. A node may be any type of general computing device capable of network communication with other computing devices (e.g., nodes). For example, each node can include some or all of the features, components, and peripherals of the machine 800 shown in FIG. 8. Examples of nodes 102, 104, 106 include sensors, ECUs, actuators, communication ports (e.g., diagnostic ports), accessory devices, and the like.

Each node 102, 104, 106 is connected to both the high wire 110 and low wire 112. As the high-speed communication bus 100 includes terminator resistors 108, 114 connecting either end of the high wire 110 and low wire 112, each of the nodes 102, 104, 106 is positioned between the terminator resistors 108, 114 and operates as an intermediate node. That is, the nodes 102, 104, 106 attached to the high-speed communication bus 100 do not utilize internal resistors to provide additional resistance to the to the high-speed communication bus 100 beyond the resistance provided by the terminator resistors 108, 114. Adding resistance beyond the resistance provided by the terminator resistors 108, 114 may negatively affect signal transmissions within the high-speed communication bus 100.

Figure 2:
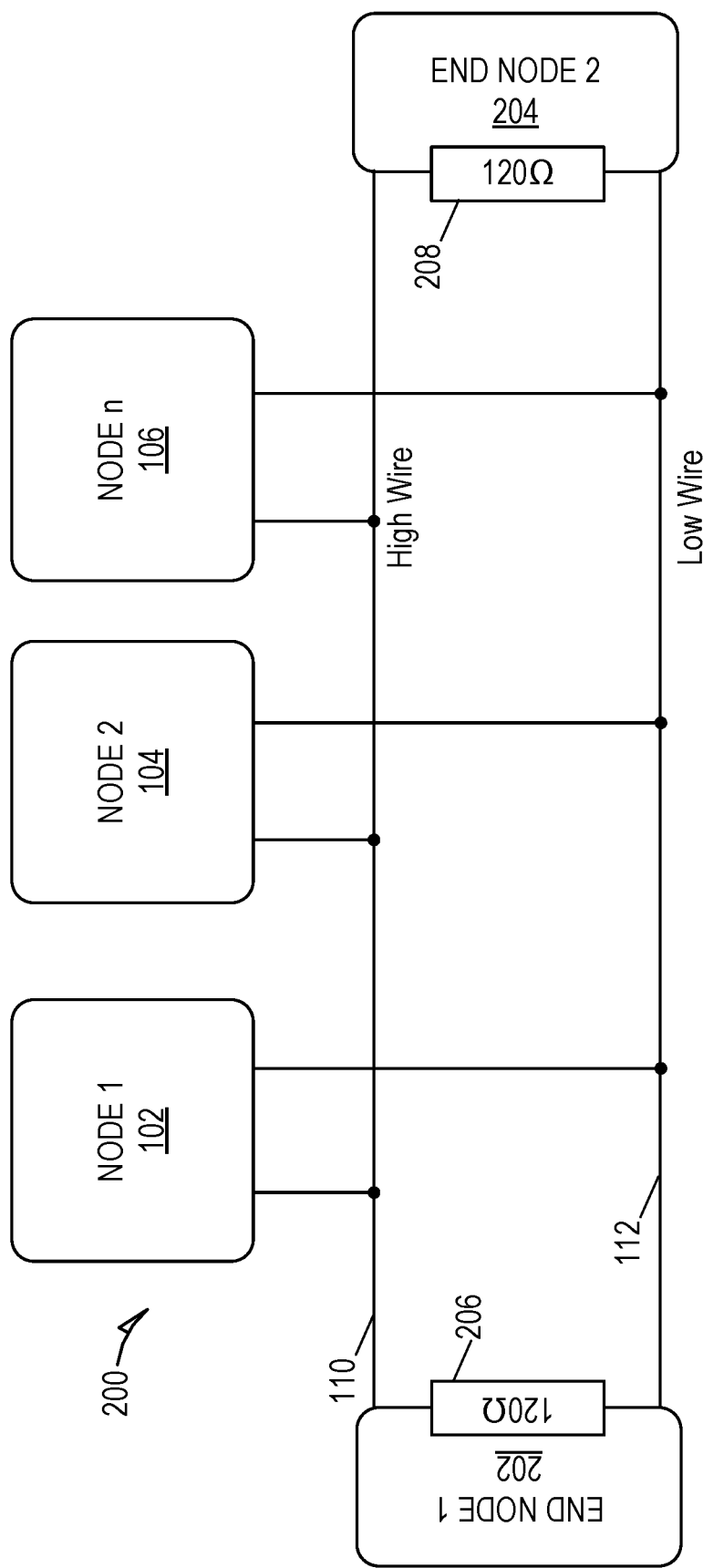
FIG. 2 is a block diagram of a high-speed communication bus with end nodes that operate as terminator resistors, according to some example embodiments.

FIG. 2 is a block diagram of a high-speed communication bus 200 with end nodes 202, 204 that operate as terminator resistors, according to some example embodiments. As shown, the high-speed communication bus 200 includes two signal wires (i.e., a high wire 110 and a low wire 112) that are connected at each end by an end node 202, 204. Each of the end nodes 202, 204 includes an internal resistor 206, 208. In this type of embodiment, the end nodes 202, 204 operate as terminator resistors for the high-speed communication bus 200. The end nodes 202, 204 may be any type of node, such as sensors, ECUs, actuators, and the like, however an end node 202, 204 is equipped with an internal resistor so that the end node 202, 204 may operate as a terminator resistor for the high-speed communication bus 200.

As the end nodes 202, 204 operate as terminator resistors for the high-speed communication bus 200, the other nodes 102, 104, 106 that are attached between the two end nodes 202, 204 operate as intermediate nodes that do not utilize internal resistors to provide additional resistance, which would negatively affect signal transmissions within the high-speed communication bus 200.

As illustrated in FIGS. 1 and 2, whether a node added to a high-speed communication bus utilizes an internal resistor to operate as a terminator resistor is dependent on whether the node is an intermediate node 120, 104, 106 positioned between two terminator resistors or an end node 202, 204 that operates as terminator resistors. For example, as shown in FIG. 1, nodes 102, 104, 106 added to a high-speed communication bus 100 with terminator resistors 108, 114 integrated at each end of the wiring harness operate as intermediate nodes that do not use an internal resistor to add resistance to the high-speed communication bus 100. Alternatively, as shown in FIG. 2, nodes added to a high-speed communication bus 200 that utilizes end nodes 202, 204 may operate as either an end node 202, 204 that utilizes an internal resistor or an intermediate node 102, 104, 106 depending on where the node is added to the high-speed communication bus 200.

Figure 3:
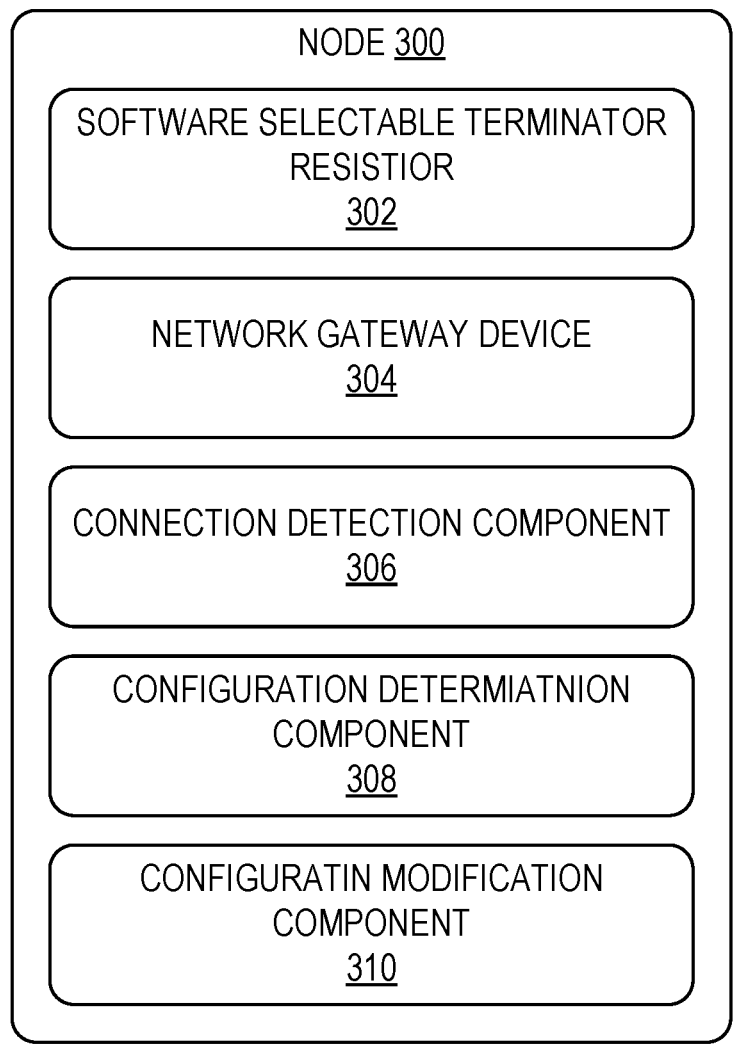
FIG. 3 is a block diagram of a node including a variable termination feature, according to some example embodiments.

FIG. 3 is a block diagram of a node 300 including a variable termination feature, according to some example embodiments. As shown, the node 300 includes a software selectable terminator resistor 302, a network gateway device 304, a connection detection component 306, a configuration determination component 308, and a configuration modification component 310. To avoid obscuring the inventive subject matter with unnecessary detail, various functional components (e.g., software components) that are not germane to conveying an understanding of the inventive subject matter have been omitted from FIG. 3. However, a skilled artisan will readily recognize that various additional functional components may be supported by the node 300 to facilitate additional functionality that is not specifically described herein. Furthermore, the various functional components depicted in FIG. 3 may reside on a single device or may be distributed across multiple devices. For example, the network gateway device 304 may be a separate physical device to which another device (e.g., accessory) is attached by a connector such as a Universal Serial Bus (USB) cable.

The software selectable terminator resistor 302 is a resistor that can be programmatically enabled or disabled to add or remove resistance as needed. For example, the software selectable terminator resistor 302 may be enabled when the node 300 is added as an end node (e.g., 202, 204) in a high-speed communication bus and operates as a terminator resistor. Alternatively, the software selectable terminator resistor 302 may be disabled when the node 300 is added as an intermediate node (e.g., 102, 104, 106) between terminator resistors in the high-speed communication bus.

The network gateway device 304 is a hardware device that acts as a gate to a network and enables traffic to flow in and out of the network to other networks. For example, the network gateway device 304 provides wireless communication capabilities with remote computing systems (not shown). That is, the network gateway device 304 is enabled to connect with wireless networks (e.g., cellular, wireless local area network, satellite communication networks, etc.), for purposes of communicating with other devices. The network gateway device 304 may also provide additional functionality, such as firewall functionality by filtering inbound and outbound communications, disallowing incoming communications from suspicious or unauthorized sources, etc.

The connection detection component 306 detects when the node 300 has been connected to a high-speed communication bus. This may include detecting that the node 300 has been connected directly to a high-speed communication bus and/or that the node 300 has been connected to another device (e.g., a network gateway device 304) that is connected directly to the high-speed communication bus. The connection detection component 306 may notify the configuration determination component 308 that the node 300 has been connected to a high-speed communication bus.

The configuration determination component 308 determines whether a configuration of the software selectable terminator resistor 302 should be modified to allow the node 300 to operate properly with the high-speed connection bus. For example, the configuration determination component 308 determines whether the software selectable terminator resistor 302 should be enabled to provide resistance, such as when the node 300 is added as an end node (e.g., 202, 204) in a high-speed communication bus and operates as a terminator resistor, or disabled when the node 300 is added as an intermediate node (e.g., 102, 104, 106) between terminator resistors in the high-speed communication bus.

The configuration determination component 308 may determine the configuration for the software selectable terminator resistor 302 using multiple techniques. For example, in some embodiments, the configuration determination component 308 utilizes a remote computing system to determine the proper configuration for the software selectable terminator resistor 302. The remote computing system maintains a vehicle data index that includes data identifying the proper configuration of nodes added to various types of vehicles. For example, the data in the vehicle data index may indicate whether a device connected to a high-speed communication bus of each type of vehicle is connected as an end node or an intermediate node.

In this type of embodiment, the configuration determination component 308 gathers an identifier for the vehicle and causes the identifier to be transmitted to the remote computing system. The identifier may be any type of unique identifier for the vehicle that may be used to derive the make and/or model of the vehicle. For example, the identifier may be a Vehicle Identification number (VIN).

The configuration determination component 308 communicates with the network gateway device 304 to cause the identifier to be transmitted to the remote computing system. For example, the configuration determination component 308 provides the network gateway device 304 with the identifier along with an instruction or command to transmit the identifier to the remote computing system.

The remote computing system uses the received identifier to identify the vehicle type of vehicle. For example, the remote computing system uses the identifier to determine the make and model of the vehicle. The remote computing system then uses the identified vehicle type to search the vehicle data index for a record corresponding to the vehicle type. The record indicates the proper configuration for devices added to a high-speed bus in vehicles of the vehicle type.

The remote computing system returns data identifying the proper configuration to the node 300, which is received by the network gateway device 304. The network gateway device 304 may then provide the data identifying the proper configuration to the configuration determination component 308. In turn, the configuration determination component 308 determines whether the configuration of the software selectable terminator resistor 302 should be modified. For example, the configuration determination component 308 determines whether the configuration of the software selectable terminator resistor 302 matches the proper configuration identified by the remote computing system.

In other embodiments, the configuration determination component 308 may determine the proper configuration of the software selectable terminator resistor 302 based on a measured resistance across the high-speed communication bus. For example, the configuration determination component 308 may apply a defined voltage (e.g., 3 Volts) across the high-speed communication bus. While the voltage is being applied, the configuration determination component 308 may measure the electrical current at multiple points on the high-speed communication bus. For example, the configuration determination component 308 may measure the current at a point along the high wire and a point along the low wire.

The configuration determination component 308 may use the electrical current measurement to determine the resistance in the high-speed communication bus. For example, the configuration determination component 308 may determine the resistance by dividing the voltage applied across the high-speed communication bus by the measured current.

The configuration determination component 308 compares the determined resistance in the high-speed communication bus to a threshold resistance range to determine whether the software selectable terminator resistor should be enabled or disabled. The threshold resistance range may be based on a target resistance used by standard high-speed communication busses. For example, the resistance in a high-speed communication bus such as CAN bus that uses two 120 Ohm terminator resistors in parallel should be approximately 60 Ohm. The threshold resistance range may be based on an acceptable variance from the expected resistance, such as a 5 Ohm variance. Accordingly, the threshold resistance range may be a range from 55 Ohms to 65 Ohms.

If the resistance in the high-speed communication bus is not within the threshold resistance range, such as being higher or lower than the threshold resistance range, the configuration determination component 308 may determine that the configuration of the software selectable terminator resistor 302 should be modified. That is, the configuration determination component 308 may determine that the current configuration of the software selectable terminator resistor 302 should be modified from being enabled to disabled, or vice versa. Alternatively, if the configuration determination component 308 determines that the resistance is within the threshold resistance range, the configuration determination component 308 may determine that the software selectable terminator resistor 302 is configured correctly and therefore does not need to be modified.

The configuration determination component 308 notifies the configuration modification component 310 in the event that the configuration determination component 308 determines that the configuration of the software selectable terminator resistor 302 should be modified. In turn, the configuration modification component 310 transmits a command to cause the software selectable terminator resistor 302 to modify its configuration. For example, the command may cause the software selectable terminator resistor 302 to modify its configuration from active to inactive, or vice versa.

Figure 4:
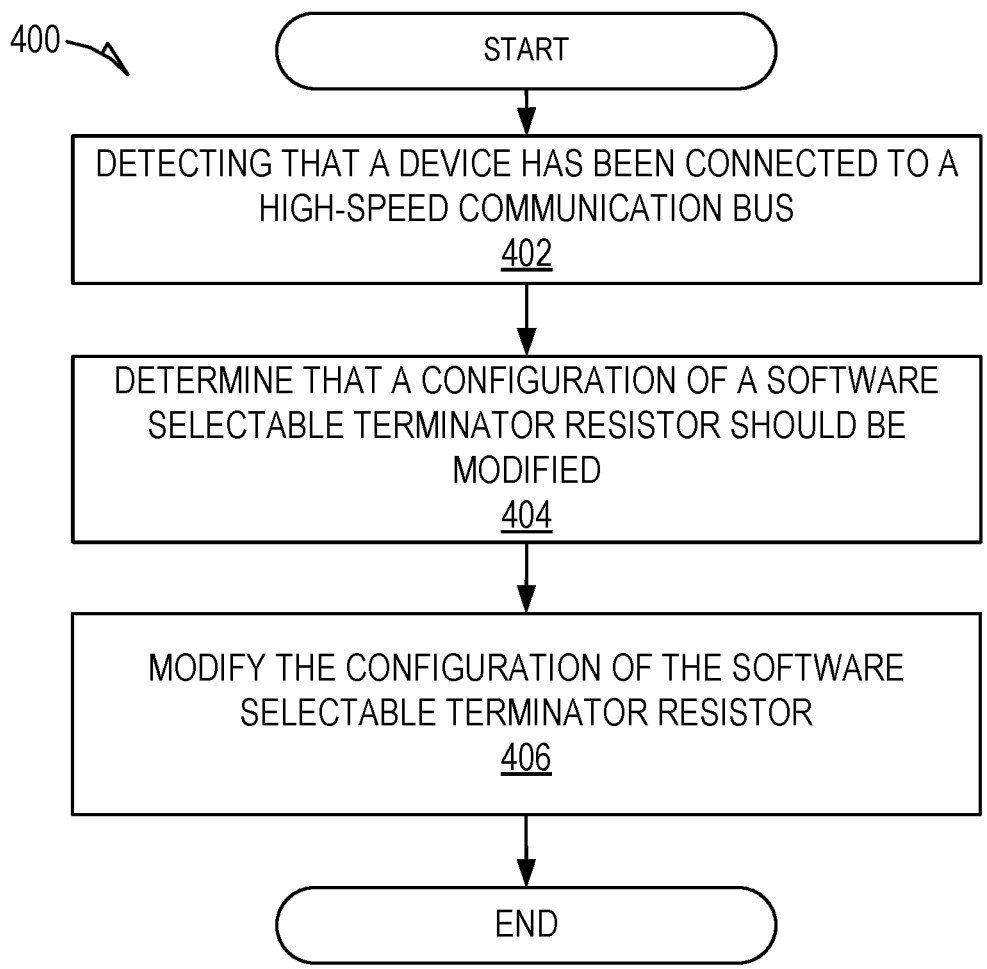
FIG. 4 is a flowchart showing a method for providing a variable termination feature in a vehicle communication bus, according to some example embodiments.

FIG. 4 is a flowchart showing a method 400 for providing a variable termination feature in a vehicle communication bus, according to some example embodiments. The method 400 may be embodied in computer readable instructions for execution by one or more processors such that the operations of the method 400 may be performed in part or in whole by the node 300; accordingly, the method 400 is described below by way of example with reference thereto. However, it shall be appreciated that at least some of the operations of the method 400 may be deployed on various other hardware configurations and the method 400 is not intended to be limited to the node 300.

At operation 402, the connection detection component 306 detects that a device has been connected to a high-speed communication bus. This may include detecting that the node 300 has been connected directly to the high-speed communication bus and/or that the node 300 has been connected to another device (e.g., a network gateway device 304) that is connected directly to the high-speed communication bus. The connection detection component 306 may notify the configuration determination component 308 that the node 300 has been connected to a high-speed communication bus.

At operation 404, the configuration determination component 308 determines that a configuration of the software selectable terminator resistor 302 should be modified. For example, the configuration determination component 308 determines whether the software selectable terminator resistor 302 should be enabled or disabled to operate properly with the high-speed connection bus. The configuration determination component 308 may determine whether the configuration for the software selectable terminator resistor 302 using multiple techniques, such as those described in relation to FIGS. 5 and 6 below.

At operation 406, the configuration modification component 310 modifies the configuration of the software selectable terminator resistor 302. For example, the configuration modification component 310 transmits a command to cause the software selectable terminator resistor 302 to modify its configuration. For example, the command may cause the software selectable terminator resistor 302 to modify its configuration from active to inactive, or vice versa.

Figure 5:
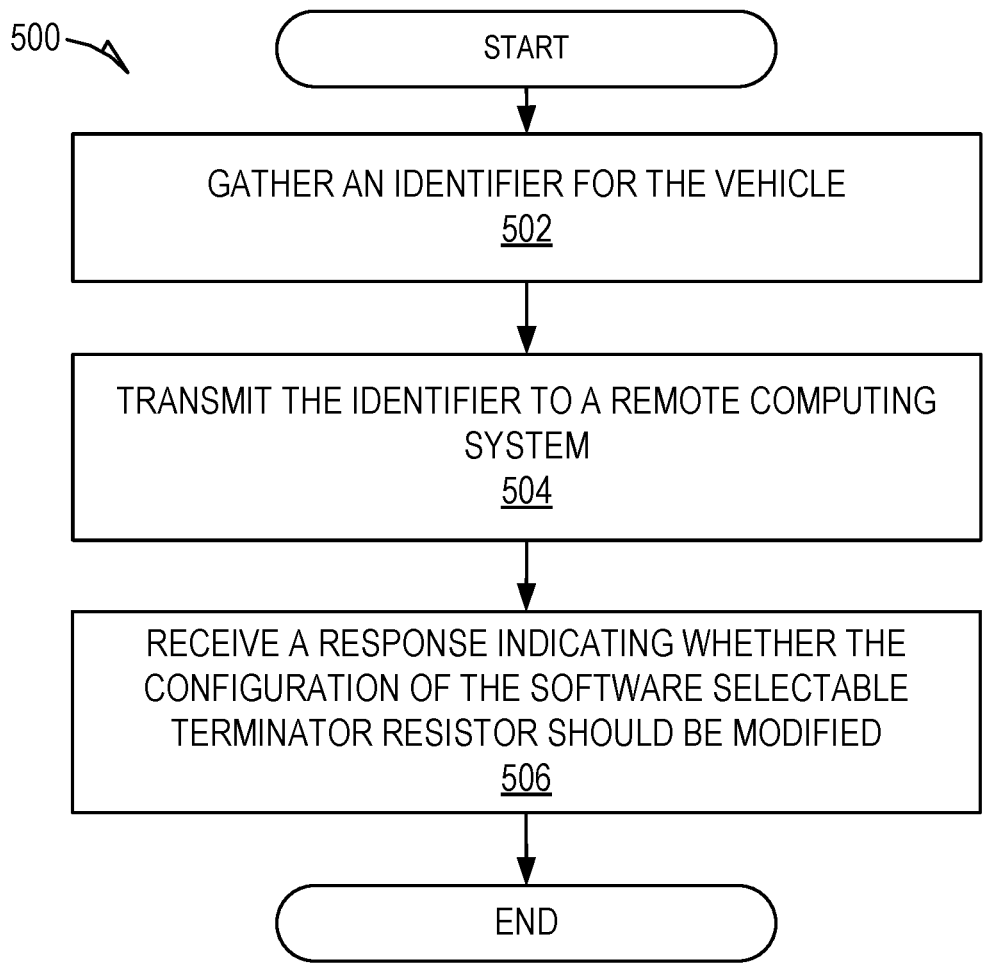
FIG. 5 is a flowchart showing a method of communicating with a remote computing system to determine a configuration of a software selectable terminator resistor, according to some example embodiments.

FIG. 5 is a flowchart showing a method 500 of communicating with a remote computing system to determine a configuration of a software selectable terminator resistor 302, according to some example embodiments. The method 500 may be embodied in computer readable instructions for execution by one or more processors such that the operations of the method 500 may be performed in part or in whole by the node 300; accordingly, the method 500 is described below by way of example with reference thereto. However, it shall be appreciated that at least some of the operations of the method 500 may be deployed on various other hardware configurations and the method 500 is not intended to be limited to the node 300.

At operation 502, the configuration determination component 308 gathers an identifier for the vehicle. The identifier may be any type of unique identifier for the vehicle that may be used to derive the make and/or model of the vehicle. For example, the identifier may be a Vehicle Identification number (VIN).

At operation 504, the configuration determination component 308 transmits the identifier to a remote computing system. The remote computing system maintains a vehicle data index that includes data identifying the proper configuration of a software selectable terminator resistor 302 to allow a node to operate properly with various types of vehicles. For example, the data in the vehicle data index may indicate whether a device connected to a high-speed communication bus of each type of vehicle is connected as an end node or an intermediate node.

The configuration determination component 308 communicates with the network gateway device 304 to cause the identifier to be transmitted to the remote computing system. For example, the configuration determination component 308 provides the network gateway device 304 with the identifier along with an instruction or command to transmit the identifier to the remote computing system.

The remote computing system uses the received identifier to identify the vehicle type of vehicle. For example, the remote computing system uses the identifier to determine the make and model of the vehicle. The remote computing system then uses the identified vehicle type to search the vehicle data index for a record corresponding to the vehicle type. The record indicates the proper configuration for devices added to a high-speed bus in vehicles of the vehicle type.

At operation 506, the configuration determination component 308 receives a response indicating whether the configuration of the software selectable terminator resistor should be modified. For example, the remote computing system returns data identifying the proper configuration software selectable terminator resistor 302 to the node 300, which is received by the network gateway device 304. The network gateway device 304 provides the received data identifying the proper configuration to the configuration determination component 308. The configuration determination component 308 may use the data to determine whether to the configuration of the software selectable terminator resistor 302 should be modified. For example, the configuration determination component 308 determines whether the configuration of the software selectable terminator resistor 302 matches the proper configuration.

Figure 6:
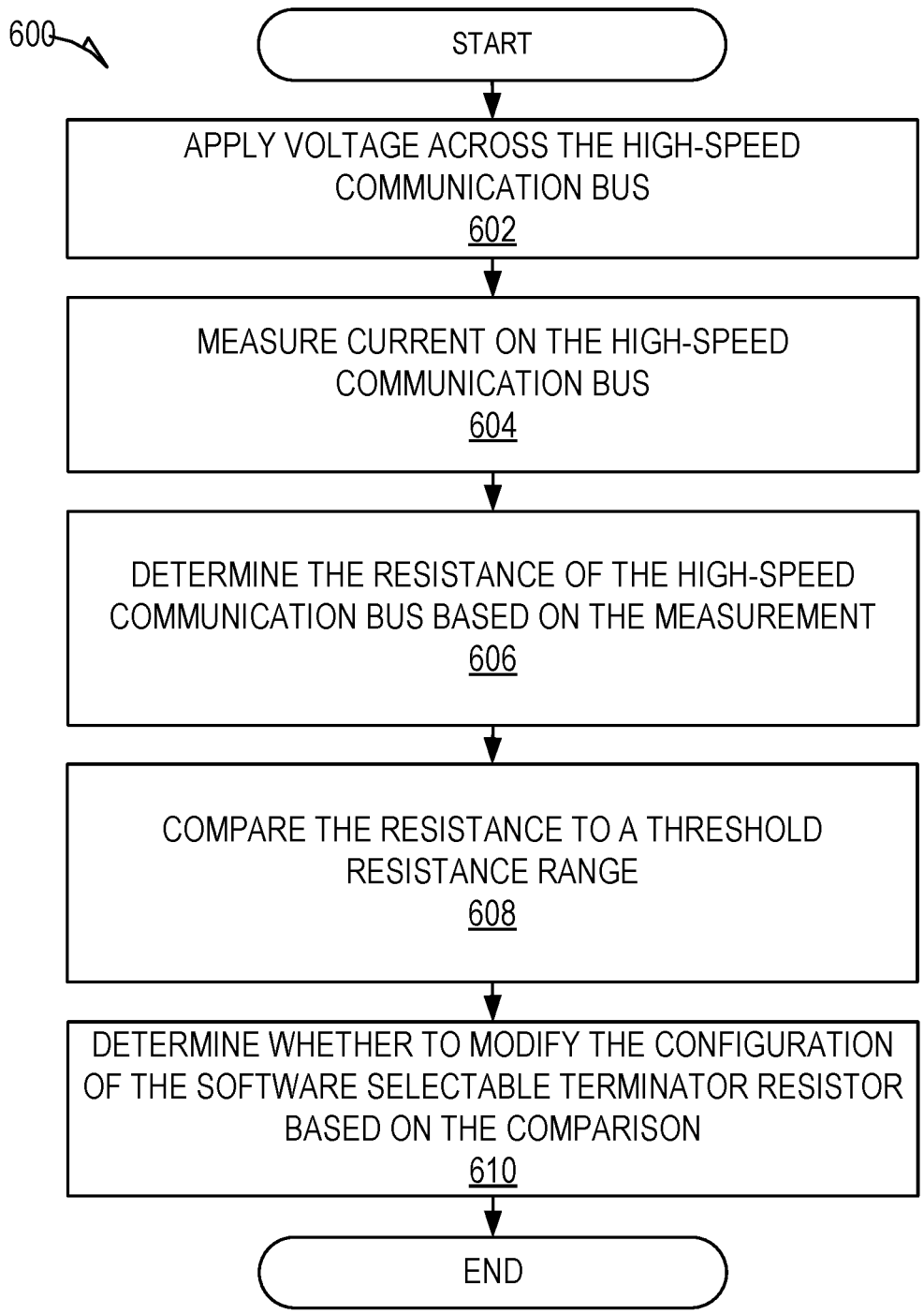
FIG. 6 is a flowchart showing a method of using a measured resistance of a high-speed communication bus to determine a configuration of a software selectable terminator resistor, according to some example embodiments.

FIG. 6 is a flowchart showing a method 600 of using a measured resistance of a high-speed communication bus to determine a configuration of a software selectable terminator resistor, according to some example embodiments. The method 600 may be embodied in computer readable instructions for execution by one or more processors such that the operations of the method 600 may be performed in part or in whole by the node 300; accordingly, the method 600 is described below by way of example with reference thereto. However, it shall be appreciated that at least some of the operations of the method 600 may be deployed on various other hardware configurations and the method 600 is not intended to be limited to the node 300.

At operation 602, the configuration determination component 308 applies voltage across the high-speed communication bus. For example, the configuration determination component 308 may apply a defined voltage (e.g., 3 Volts) across the high-speed communication bus.

At operation 604, the configuration determination component 308 measures current on the high-speed communication bus. While the voltage is being applied, the configuration determination component 308 may measure the current at multiple points on the high-speed communication bus. For example, the configuration determination component 308 may measure the current at a point along the high wire and a point along the low wire.

At operation 606, the configuration determination component 308 determines the resistance of the high-speed communication bus based on the measurement. For example, the configuration determination component 308 may determine the resistance by dividing the voltage applied across the high-speed communication bus by the measured current.

At operation 608, the configuration determination component 308 compares the resistance to a threshold resistance range. The threshold resistance range may be based on a target resistance used by standard high-speed communication busses, such as CAN bus. For example, the threshold resistance range may be based on 60 Ohms, such as being a range from 55 Ohms to 65 Ohms.

At operation 610, the configuration determination component 308 determines whether to modify the configuration of the software selectable terminator resistor based on the comparison. If the resistance in the high-speed communication bus is not within the threshold resistance range, such as being higher or lower than the threshold resistance range, the configuration determination component 308 may determine that the configuration of the software selectable terminator resistor 302 should be modified. That is, the configuration determination component 308 may determine that the current configuration of the software selectable terminator resistor 302 should be modified from being enabled to disabled, or vice versa. Alternatively, if the configuration determination component 308 determines that the resistance is within the threshold range, the configuration determination component 308 may determine that the software selectable terminator resistor 302 is configured correctly and therefore does not need to be modified.

Software Architecture

Figure 7:
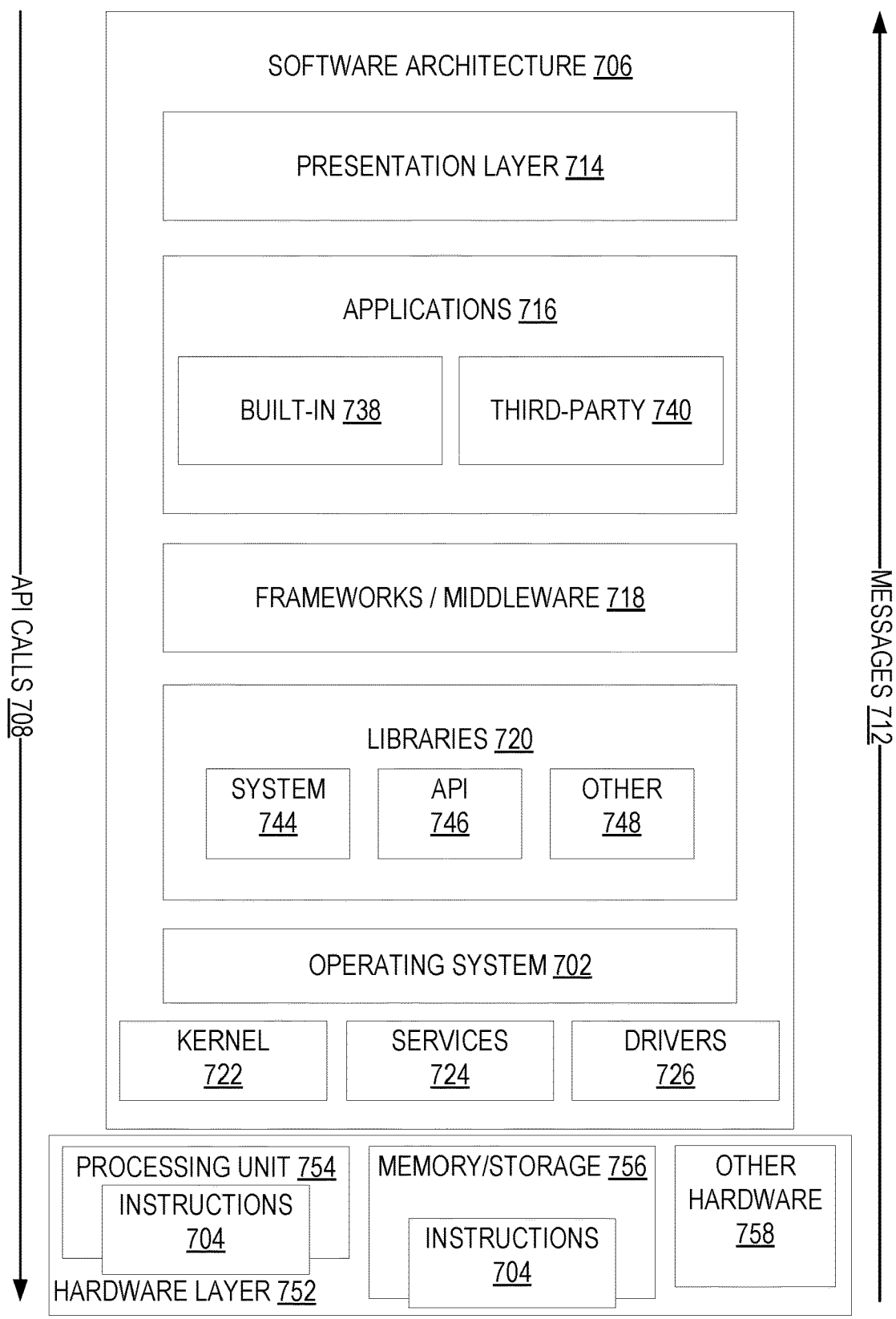
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
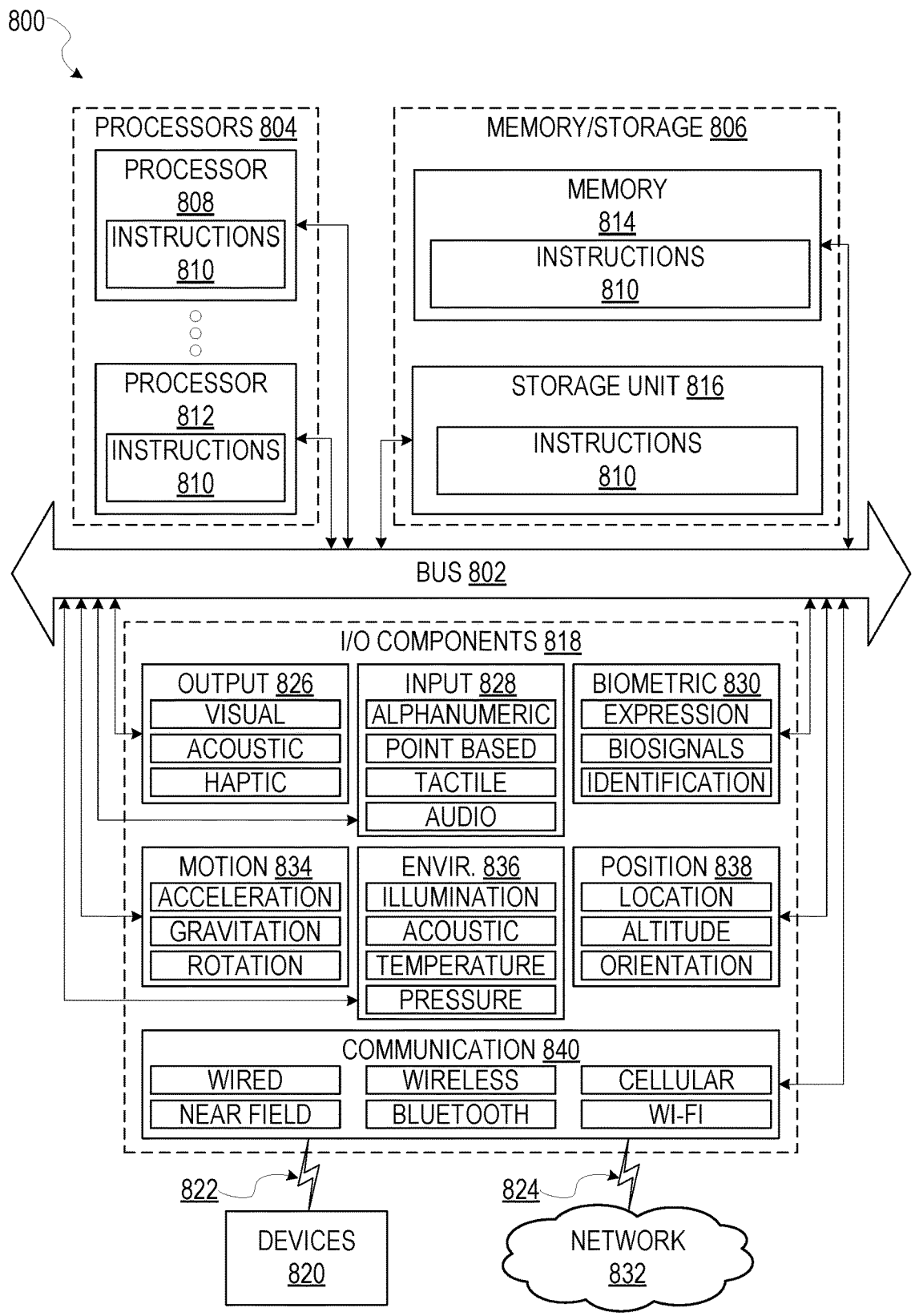
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method comprising:
   detecting that a device has been connected to a high-speed communication bus implemented within a vehicle, the high-speed communication bus including a pair of signal wires connected by a first terminator resistor;
   determining whether a configuration of a software selectable terminator resistor should be modified to achieve a resistance between the pair of signal wires of the high-speed communication bus that is within a threshold resistance range, the software selectable terminator resistor being configured in a first configuration, wherein determining whether the configuration of the software selectable terminator resistor should be modified comprises:
   transmitting an identifier associated with the vehicle to a remote computing system, the remote computing system maintaining a vehicle data index including data identifying whether the configuration of the software selectable terminator resistor should be in the first configuration or a second configuration for each of a plurality of vehicles; and
   receiving, from the remote computing system, a response indicating that the configuration of the software selectable terminator resistor should be in the second configuration, the remote computing system having determined that the configuration of the software selectable terminator resistor should be in the second configuration based on the identifier and the vehicle data index; and
   in response to determining that the configuration of the software selectable terminator resistor should be modified to achieve the resistance within the threshold resistance range, modify the configuration of the software selectable terminator resistor from the first configuration to the second configuration.

2. The method of claim 1, wherein the identifier is a Vehicle Identification Number (VIN).

3. The method of claim 1, wherein the software selectable terminator resistor is enabled when configured in the first configuration and the software selectable terminator resistor is disabled when configured in the second configuration.

4. The method of claim 1, wherein determining whether the configuration of the software selectable terminator resistor should be modified comprises:
   applying a voltage across the high-speed communication bus;
   while the voltage is being applied across the high-speed communication bus, measuring current at a first point on the high-speed communication bus and at a second point on the high-speed communication bus, yielding a current reading;
   determining, the resistance on the high-speed communication bus based on the current reading; and
   comparing the resistance to the threshold resistance range.

5. The method of claim 4, wherein the threshold resistance range is based on 60 Ohms of resistance.

6. The method of claim 4, wherein the first point on the high-speed communication bus is on a first wire of the pair of signal wires and the second point on the high-speed communication bus is on a second wire of the pair of signal wires.

7. The method of claim 1, wherein the high-speed communication bus is a CAN bus.

8. The method of claim 1, wherein detecting that the device has been connected to high-speed communication bus comprises:
   detecting that the device has been connected to a network gateway device that is connected to the high-speed communication bus.

9. The method of claim 1, wherein detecting that the device has been connected to high-speed communication bus comprises:
   detecting that the device has been connected to a communication port of the high-speed communication bus.

10. A system comprising:
    one or more computer processors; and
    one or more computer-readable mediums storing instructions that, when executed by the one or more computer processors, cause the system to perform operations comprising:
    detecting that a device has been connected to a high-speed communication bus implemented within a vehicle, the high-speed communication bus including a pair of signal wires connected by a first terminator resistor;
    determining whether a configuration of a software selectable terminator resistor should be modified to achieve a resistance between the pair of signal wires of the high-speed communication bus that is within a threshold resistance range, the software selectable terminator resistor being configured in a first configuration, wherein determining whether the configuration of the software selectable terminator resistor should be modified comprises:
    transmitting an identifier associated with the vehicle to a remote computing system, the remote computing system maintaining a vehicle data index including data identifying whether the configuration of the software selectable terminator resistor should be in the first configuration or a second configuration for each of a plurality of vehicles; and
    receiving, from the remote computing system, a response indicating that the configuration of the software selectable terminator resistor should be in the second configuration, the remote computing system having determined that the configuration of the software selectable terminator resistor should be in the second configuration based on the identifier and the vehicle data index; and
    in response to determining that the configuration of the software selectable terminator resistor should be modified to achieve the resistance within the threshold resistance range, modify the configuration of the software selectable terminator resistor from the first configuration to the second configuration.

11. The system of claim 10, wherein the identifier is a Vehicle Identification Number (VIN).

12. The system of claim 10, wherein the software selectable terminator resistor is enabled when configured in the first configuration and the software selectable terminator resistor is disabled when configured in the second configuration.

13. The system of claim 10, wherein determining whether the configuration of the software selectable terminator resistor should be modified comprises:
    applying a voltage across the high-speed communication bus;
    while the voltage is being applied across the high-speed communication bus, measuring current at a first point on the high-speed communication bus and at a second point on the high-speed communication bus, yielding a current reading;

determining, the resistance on the high-speed communication bus based on the current reading; and comparing the resistance to the threshold resistance range.

14. The system of claim 13, wherein the threshold resistance range is based on 60 Ohms of resistance.

15. The system of claim 13, wherein the first point on the high-speed communication bus is on a first wire of the pair of signal wires and the second point on the high-speed communication bus is on a second wire of the pair of signal wires.

16. The system of claim 10, wherein the high-speed communication bus is a CAN bus.

17. The system of claim 10, wherein detecting that the device has been connected to high-speed communication bus comprises:

detecting that the device has been connected to a network gateway device that is connected to the high-speed communication bus.

18. A non-transitory computer-readable medium storing instructions that, when executed by one or more computer processors of one or more computing devices, cause the one or more computing devices to perform operations comprising:

detecting that a device has been connected to a high-speed communication bus implemented within a vehicle, the high-speed communication bus including a pair of signal wires connected by a first terminator resistor;

determining whether a configuration of a software selectable terminator resistor should be modified to achieve a resistance between the pair of signal wires of the high-speed communication bus that is within a threshold resistance range, the software selectable terminator resistor being configured in a first configuration, wherein determining whether the configuration of the software selectable terminator resistor should be modified comprises:

transmitting an identifier associated with the vehicle to a remote computing system, the remote computing system maintaining a vehicle data index including data identifying whether the configuration of the software selectable terminator resistor should be in the first configuration or a second configuration for each of a plurality of vehicles; and receiving, from the remote computing system, a response indicating that the configuration of the software selectable terminator resistor should be in the second configuration, the remote computing system having determined that the configuration of the software selectable terminator resistor should be in the second configuration based on the identifier and the vehicle data index; and in response to determining that the configuration of the software selectable terminator resistor should be modified to achieve the resistance within the threshold resistance range, modify the configuration of the software selectable terminator resistor from the first configuration to a second configuration.

\* \* \* \* \*